（12）United States Patent
Potter et al.

(10) Patent No.: US 8,070,446 B2
(45) Date of Patent: Dec. 6, 2011

(54) WIND TURBINE BLADE PITCH CONTROL SYSTEM

(75) Inventors: Benjamin Potter, Reading (GB);
Ryuichi Nagasaki, Fujisawa (JP);
Mamoru Shiga, Chigasaki (JP)

(73) Assignee: Moog Japan Ltd. (JP)

( * ) Notice: Subject to any disclaimer, the term of this patent is extended or adjusted under 35 U.S.C. 154(b) by 632 days.

(21) Appl. No.: 12/283,254

(22) Filed: Sep. 10, 2008

(65) Prior Publication Data

US 2010/0061852 A1    Mar. 11, 2010

(51) Int. Cl.
*B63H 3/00* (2006.01)
*B64C 11/00* (2006.01)
*B64C 27/00* (2006.01)

(52) U.S. Cl. ............ 416/155; 416/31; 416/147; 290/55

(58) Field of Classification Search ................ 416/1, 30, 416/31, 41, 43, 47, 147, 155, 230, 233, 238, 416/240; 290/44, 55
See application file for complete search history.

(56) References Cited

U.S. PATENT DOCUMENTS

| | | | |
|---|---|---|---|
| 7,086,834 B2 * | 8/2006 | LeMieux ............................ 416/1 |
| 7,118,338 B2 * | 10/2006 | Moroz et al. ....................... 416/1 |
| 7,394,166 B2 * | 7/2008 | Teichmann et al. .............. 290/44 |
| 7,759,815 B2 * | 7/2010 | Christensen ..................... 290/55 |
| 7,763,989 B2 * | 7/2010 | Kinzie et al. ..................... 290/44 |
| 7,944,079 B1 * | 5/2011 | Signore et al. ................... 290/55 |
| 7,945,350 B2 * | 5/2011 | Kinzie et al. ................... 700/280 |
| 7,969,037 B2 * | 6/2011 | Segovia et al. ................. 290/55 |
| 2007/0025840 A1 * | 2/2007 | Weaver et al. ............. 415/122.1 |
| 2008/0199309 A1 * | 8/2008 | Bagepalli et al. ........... 415/170.1 |
| 2009/0162202 A1 * | 6/2009 | Nies et al. ...................... 416/147 |

* cited by examiner

*Primary Examiner* — Chris Chu
(74) *Attorney, Agent, or Firm* — Phillips Lytle LLP

(57) ABSTRACT

The present invention provides an improvement for a wind turbine (20) having at least one blade (21) mounted on a hub (22) for controlled rotation about a blade axis ($y_b$-$y_b$) to vary the pitch of the blade relative to an airstream. The hub is mounted on a nacelle (23) for rotation about a hub axis ($x_h$-$x_h$). The wind turbine includes a main pitch control system for selectively controlling the pitch of the blade, and/or a safety pitch control system for overriding the main blade pitch control system and for causing the blade to move toward a feathered position in the event of an overspeed or fault condition. The improvement includes: an energy storage device (26) mounted on the nacelle and associated with the blade; a pitch-axis controller (25) mounted on the nacelle and associated with the blade and with the energy storage device; an electro-mechanical actuator (28) mounted on the hub and associated with the blade; and at least one slip ring (29) operatively arranged to transmit power and/or data signals between the pitch-axis controller and the electro-mechanical actuator; whereby the mass on the rotating hub may be reduced.

11 Claims, 3 Drawing Sheets

WIND TURBINE BLADE PITCH CONTROL SYSTEM

TECHNICAL FIELD

The present invention relates generally to wind turbines having a plurality of blades mounted on a hub for independent controlled rotation about their respective individual blade axes, and, more particularly, to improved wind turbine blade pitch control systems in which certain components that have heretofore been mounted on the rotating hub, are relocated to the nacelle.

BACKGROUND ART

Modern wind turbines adjust rotor blade pitch for several reasons. One reason is to improve blade efficiency by adapting the blade aerodynamics to optimize efficiency with wind speed changes. Another reason is to take the blades to an unloaded, or feathered condition, in the event that wind speed exceeds the maximum safe rated speed or in the event of fault conditions.

Modern wind turbines may have two separate and independent blade pitch control systems: (1) a main blade pitch control system that is used to optimize performance during normal operating conditions, and (2) a safety pitch control system that is adapted to override the main blade pitch control system and to cause each of the blades to move toward an unloaded or feathered condition in the event of a sensed fault or in the event that the wind speed exceeds a predetermined maximum.

The main blade pitch control system is typically controlled by a closed-loop pitch-axis controller. This controller automatically adjusts the operational state of the turbine in order to keep it on some pre-defined operating curve or characteristic. The controller changes the blade pitch, or angle, through a blade pitch actuator. This actuator may be either electrically or hydraulically powered.

The safety pitch control system may be separate and distinct from the main blade pitch control system. Its function is to bring the turbine to a safe condition in the event of a problem. The safety system normally does not depend on adaptive electronics. Rather, the actuator is normally hard-wired to a battery through normally-open relay contacts that selectively close under a fault condition or in the event of an overspeed condition.

Heretofore, the pitch-axis controller, the battery and the electro-mechanical actuator for varying the pitch of each blade, were located in the hub. These were components of a safety pitch control system. This increased the mass of the rotating hub, required the use of premium components, and presented space constraints within the hub.

Thus, there would be a distinct advantage to moving or relocating the batteries and the control electronics to the nacelle.

DISCLOSURE OF THE INVENTION

With parenthetical reference to the corresponding parts, portions or surfaces of the disclosed embodiment, merely for purposes of illustration and not by way of limitation, the present invention broadly provides an improvement (40) in a wind turbine having at least one blade (21) mounted on a hub (22) for controlled rotation about a blade axis ($y_b$-$y_b$) to vary the pitch of the blade relative to an airstream, wherein the hub is mounted on a nacelle (23) for rotation about a hub axis ($x_h$-$x_h$); and wherein the wind turbine includes a main pitch control system for selectively controlling the pitch of the blade and/or a separate safety pitch control system for overriding the main blade pitch control system and for causing the blade to move toward a feathered position in the event of a fault condition or an overspeed condition.

The improvement broadly includes: an energy storage device (26) mounted on the nacelle and associated with the blade; a pitch-axis controller (25) mounted on nacelle and associated with the blade and the energy storage device; an electro-mechanical actuator (28) mounted on the hub and associated with the blade; and at least one slip ring (29) operatively arranged to transmit power and/or data signals between the pitch-axis controller and the electro-mechanical actuator; whereby the mass of the hub may be reduced.

In the event of a fault or overspeed condition, the slip ring may transfer power from the energy storage device to the actuator.

The data signals may be optical, and may be multiplexed. Alternatively, there may be a separate slip ring for each power and/or data channel.

The wind turbine may have a plurality of blades, and the slip ring may be arranged to transmit power and data signals between pitch controller and the electro-mechanical actuator associated with each blade. If multiple blades are present, as is typically the case, an energy storage device (e.g., a battery), a pitch-axis controller and an electro-mechanical actuator may be associated with each blade. In some cases, the energy storage device may be shared by different blades.

The energy storage device and the pitch-axis controller may be part of the safety pitch control system.

The main pitch control system and the safety pitch control system may be partially redundant, or may have common components.

A fault sensor may be arranged to detect a fault or overspeed condition and may be arranged to supply a signal reflective of such detected fault or overspeed condition to the pitch-axis controller.

The slip ring may be a part of the main pitch control system and the safety pitch control system.

The slip ring may be contactless.

Accordingly, the general object of the invention is to provide an improved pitch control system for a wind turbine.

Another object may be to provide an improved wind turbine blade pitch control system which reduces the mass of the rotating hub.

Another object is to provide an improved wind turbine blade pitch control system which allows some or all of the batteries and pitch-axis controllers to be relocated from the hub to the nacelle, thereby affording the advantage of cost reduction by combining cabinets, ease of access and maintenance by relocating the batteries and controllers to the nacelle, and overall system simplification.

These and other objects and advantages will become apparent from the foregoing and ongoing written specification, the drawings and the appended claims.

DESCRIPTION OF THE PREFERRED EMBODIMENTS

Figure 1:
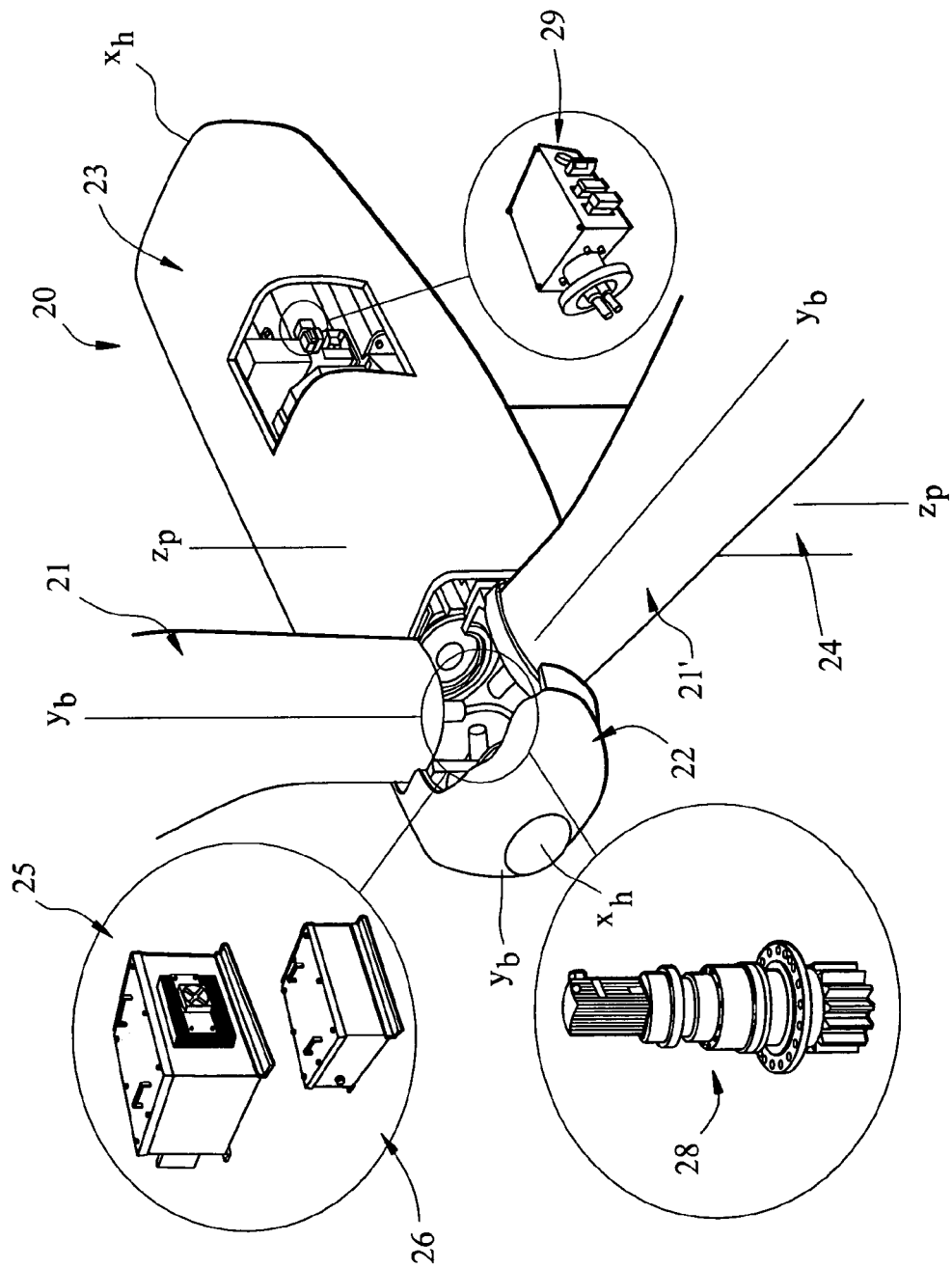
FIG. 1 is a perspective view of a portion of a wind turbine, showing enlarged detail views of the controller, battery, electro-mechanical actuator and slip ring relative to the wind turbine, and also showing their locations in a prior art design.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
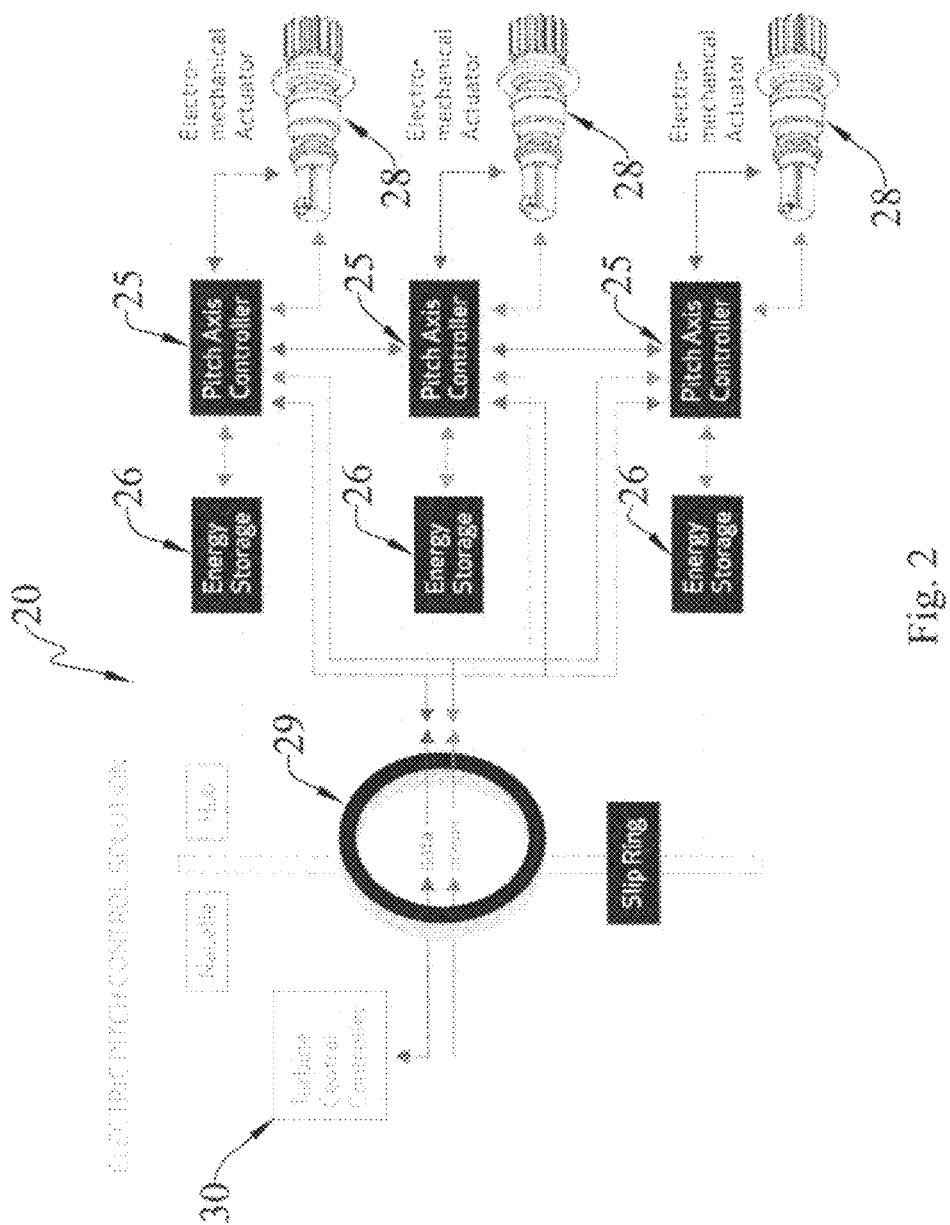
FIG. 2 is schematic block diagram of the typical prior art system shown in FIG. 1, with the battery, pitch-axis controller and electro-mechanical actuators for each blade being mounted on the hub.

Prior Art System (FIGS. 1 and 2)

A typical prior art system, generally indicated at 20, is shown in FIG. 1. This system has a plurality of blades, severally indicated at 21, mounted on a hub, generally indicated at 22. Each of the blades is adapted to be selectively rotated about the longitudinal axis ($y_b$-$y_b$) of the blade relative to the hub to vary the angle or pitch of the blade relative to the airstream in which it is positioned.

The hub 22 is mounted on a nacelle, generally indicated at 23, for rotation about a hub axis ($x_h$-$x_h$). The nacelle is typically pivotally mounted on the upper end of a supporting tower or post 24. Thus, the nacelle is freed to pivot about the vertical axis ($z_p$-$z_p$) of tower 24 so as to orient itself relative to the wind direction or airstream. The passage of wind over the various blades causes the hub to rotate about its axis ($x_h$-$x_h$) relative to the nacelle. As indicated above, each of the blades is arranged to be selectively rotated about its own longitudinal axis ($y_b$-$y_b$) to vary the pitch of the blade relative to the airstream.

Still referring principally to FIG. 1, in the prior art system, the controller, the battery and the actuator were typically located within the hub in the base of each blade. These components were part of the safety pitch control system. In some cases, the actuator may have been shared with the main blade pitch control system. Each of the blades was typically controllable independently of the other, as a function of its angular position relative to the nacelle. The advantage of having independent main blade pitch control and safety systems on each blade was to meet the safety requirement that the wind turbine have at least two independent braking systems capable of bringing the turbine from a full load to a safe or feathered state in the event of a failure or in the event of an excessive wind load. Assuming that the individual pitch actuators can be made independently fail-safe, this safety requirement leads to the general concept that any one blade system can fail, leaving the other blades to feather in a fault or an over-wind condition.

FIG. 1 also depicts the pitch-axis controller 25, battery 26, and electro-mechanical actuator 28 associated with each blade. Power and control signals are carried to and/or from the several rotating controllers through a slip ring 29. The general unreliability of prior art slip rings was often cited as the primary reason that the controllers and batteries must be mounted on the hub. The pitch-axis controller was put on the rotating side of the slip ring so that high bandwidth actuator control signals did not have to pass through the slip ring. The battery was positioned in the hub so that in the event of a complete power failure or a failure of the slip ring, the hub-mounted battery would still be available to provide power to drive the blade toward a feathered condition. This has become the accepted standard in the industry.

This disadvantage of this system is that multiple sets of electronics and/or batteries must be housed or contained within the rotating hub, where they are exposed to centrifugal forces and tight packaging constraints. In addition, the hub is difficult to access for regular servicing.

Referring now to FIG. 2, the prior art arrangement shown in FIG. 1 is depicted as having three blades mounted on the hub. Accordingly, each blade is shown as containing a battery 26, a pitch-axis controller 25, and an electro-mechanical actuator 28. A central controller 30 for the turbine communicates with the various pitch-axis controllers through slip ring 29. Power is also transmitted across this slip ring to the various actuators. The turbine central controller 30 was typically mounted on the nacelle, the slip ring provided the interface between the nacelle and the hub, and the batteries 26, 26, 26, pitch-axis controllers 25, 25, 25 and electro-mechanical blade pitch actuators 28, 28, 28 were all mounted on the rotating hub. As visually depicted in FIG. 1, there were physical size, space and envelope constraints in the hub within which to mount these various components. Moreover, they contributed to the mass of the rotating hub, and were less accessible than components that were located within the nacelle.

Figure 3:
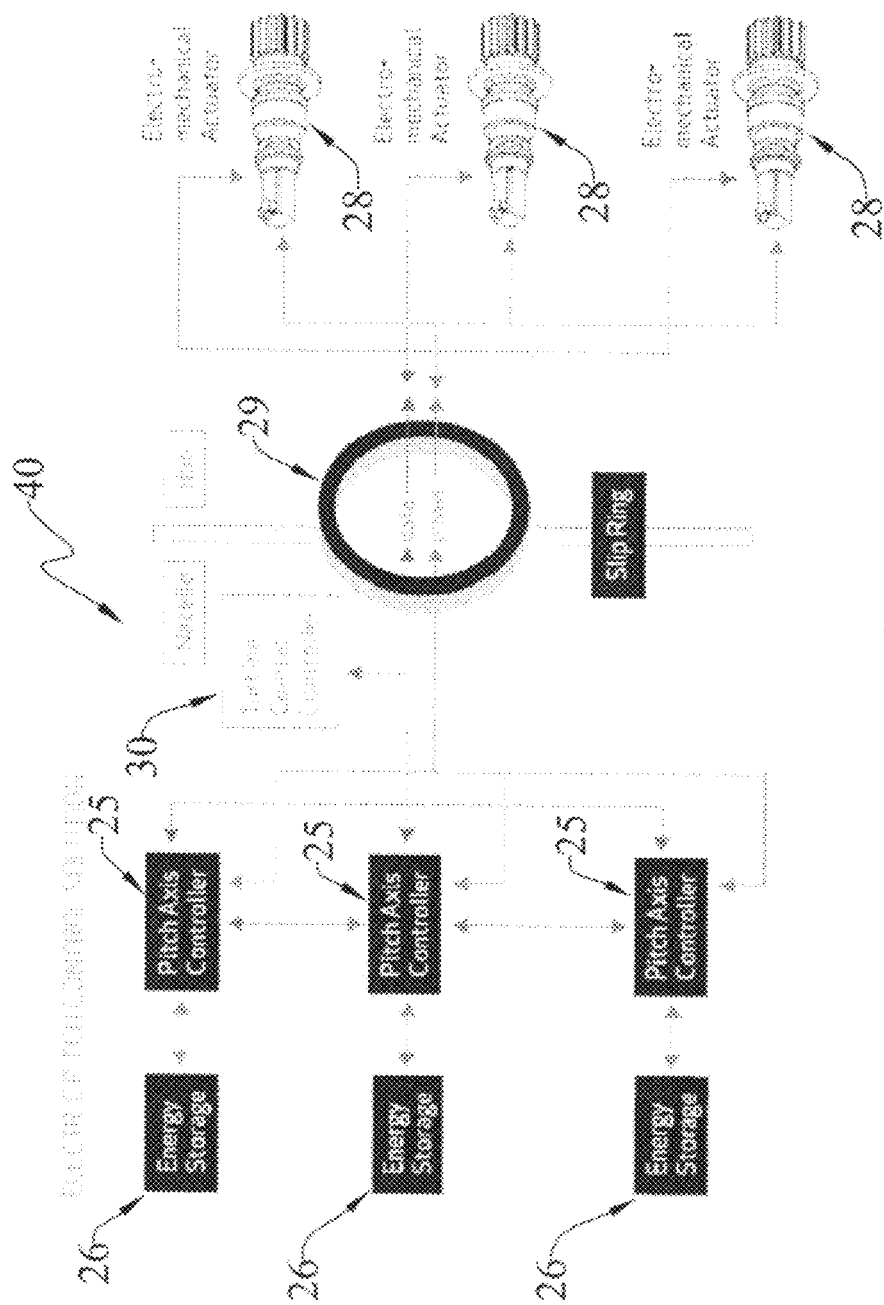
FIG. 3 is a schematic block diagram of an improved blade pitch control system, showing the batteries and pitch-axis controllers as having been relocated to the nacelle, and communicating with the various electro-mechanical actuators on the hub via at least one slip ring.

Improved System (FIG. 3)

The improved pitch control system according to the present invention is generally indicated at 40 in FIG. 3. The improved pitch control system contains many of the same elements previously described. Hence, the same reference numerals will be used in FIG. 3 to refer to the corresponding components previously described with respect to FIG. 2. Thus, the improved system 40 again includes three batteries, severally indicated at 26, and three pitch-axis controllers, severally indicated at 25. The salient difference is that these batteries and pitch-axis controllers are now located on the nacelle rather than on the hub, as in the prior art arrangement. The turbine central controller 30 is also located on the nacelle. The various electro-mechanical actuators, severally indicated at 28, are located on the rotating hub. These actuators communicate with the various pitch-axis controllers through the slip ring 29. Thus, the present invention has a redundant slip ring system, and eliminates the unnecessary redundancy of other components, and moves the pitch-axis controllers and the energy-storage devices to the nacelle. By the application of this system, the various components can be consolidated, and a single cabinet can accommodate all the electronics. Moreover, the invention allows the use of lower-rated less-expensive electrical components, and affords the capability of greater accessibility to controls within the nacelle.

The slip ring may be an optical slip ring or some other contactless device. The data may be multiplexed through the slip ring to reduce the number of physical channels. Slip ring redundancy can be accomplished by having, in tandem, two sets of the same slip ring, for example, with switching devices and error-error-detection systems. If desired, separate slip rings can be used for each data and/or power channel. Thus, the invention provides a rotary joint that will provide independent and redundant power transfer from the safety blade pitch power system on the nacelle to the rotating actuator of each blade.

One method of implementation is to provide a power and signal slip ring for transferring data and/or power between the hub and the nacelle, and, more particularly, between the power supply and the controller and three independent slip rings for each of the safety circuits. Each of these slip rings has its own independent structure, bearings and rings/brush contacts, and is not operational under normal conditions. These rings can be selectively actuated into a power transfer condition by the system that presently actuates the safety circuit in fault or over-wind conditions. Instead of two rings (i.e., power and return) for each actuator, all three circuits could share a common return ring.

Other methods of shared components and/or partial redundancy can also be utilized. For example, independent safety rings can be provided on a common shaft and bearing support system that is independent from the primary slip ring, and is actuated by a system fault sensor. The primary slip ring can be designed with the requisite redundant systems to satisfy the requirement for independent blade pitch control systems.

Another method of implementation is to provide independent power circuits for each blade pitch actuator as part of the regular slip ring. This can be coupled with redundant bearing designs, or redundant brush designs, to satisfy the system safety requirement.

Another method of implementation is to provide a power and signal slip ring for transferring data and/or power between the power supply and controllers to the three independent blade pitch actuators using contactless powered devices, such as a rotary transformer, for each of the safety circuits. These safety power devices have their own independent structure, bearings and ring/brush contacts, and they are non-operational under normal conditions. These independent power devices can be selectively actuated into a power transfer condition by the same system that presently actuates the safety circuit in fault conditions.

Still another method of implementation is to provide independent contactless power devices for each blade pitch actuator as part of the main blade pitch control system. These independent devices can serve as power transfer devices for both normal blade pitch control, as well as safety pitch control. This can be coupled with redundant bearing designs and/or redundant brush designs to satisfy the safety requirement. The contactless power transfer device can be designed to drive the actuator directly without the need for intermediate electronics for power conversion.

The invention thus provides a rotary joint that will provide sufficient signal quality across the hub/nacelle wind turbine interface to allow motor control across this interface. Another method of implementation is to use broadband slip ring technology that will allow high data rate signals to be transfer on copper transmission lines. This broadband slip ring technology can be used with multiplexing techniques to reduce the number of signal rings required. Another method of implementation is to use a fiber optic rotary joint for signal transfer of an optical fiber. The fiber data transmission can be coupled with multiplexing to allow combining the signals onto a single fiber for transmission across the rotary joint. The multiplexing can provide bi-directional signals on a single fiber, or redundant signals on two fibers, or unidirectional signals on two fibers, etc, as desired. Still another method is to use other contactless signal techniques, such as RF or capacitive, to transfer the data with or without multiplexing techniques.

MODIFICATIONS

The present invention contemplates that many changes and modifications may be made. For example, the principles of the invention are generally applicable to a multi-blade wind turbine. Thus, this may be implemented whether the wind turbine has two, three or more blades. While it is presently desirable that each of the blades be independently controllable, this is not invariable. Other devices that may provide main pitch control system and/or a safety pitch control system may be used. These systems may be operated independently, or may have some partial redundancy or common components.

Therefore, while the preferred form of the present invention has been shown and described, and several modifications thereof described, persons skilled in this art will readily appreciate that various additional changes and modifications may be made without departing from the spirit of the invention, as defined and differentiated by the following claims.

What is claimed is:

1. In a wind turbine having at least one blade mounted on a hub for controlled rotation about a blade axis to vary the pitch of said blade relative to an airstream, wherein said hub is mounted on a nacelle for rotation about a hub axis; the improvement which comprises:
    an energy storage device mounted on said nacelle and associated with said blade;
    a pitch-axis controller mounted on nacelle and associated with said blade and said energy storage device;
    an electro-mechanical actuator mounted on said hub and associated with said blade; and
    at least one slip ring operatively arranged to transmit power and/or data signals between said pitch-axis controller and said electro-mechanical actuator;
    whereby the mass of said hub may be reduced.

2. The improvement as set forth in claim 1 wherein, in the event of a fault condition, said slip ring transfers power from said energy storage device to said actuator.

3. The improvement as set forth in claim 1 wherein said data signals are optical.

4. The improvement as set forth in claim 3 wherein said data signals are multiplexed.

5. The improvement as set forth in claim 1 wherein said wind turbine has a plurality of blades, and wherein said slip ring is arranged to transmit power and data signals between pitch controller and the electro-mechanical actuator associated with each blade.

6. The improvement as set forth in claim 1 wherein said wind turbine includes a main pitch control system for selectively controlling the pitch of said blade and a safety pitch control system for overriding said main blade pitch control system and for causing said blade to move toward a feathered position in the event of a fault or overspeed condition.

7. The improvement as set forth in claim 6 wherein said energy storage device and said pitch controller are part of said safety pitch control system.

8. The improvement as set forth in claim 6 wherein said main pitch control system and said safety pitch control system are partially redundant.

9. The improvement as set forth in claim 6 wherein said slip ring is a part of said main pitch control system and said safety pitch control system.

10. The improvement as set forth in claim 1 and further comprising:
    a fault sensor arranged to detect a fault condition and arranged to supply a signal reflective of such detected fault condition to said pitch-axis controller.

11. The improvement as set forth in claim 1 wherein said slip ring is contactless.

* * * * *